(12) United States Patent
Fraser et al.

(10) Patent No.: US 6,889,715 B2
(45) Date of Patent: May 10, 2005

(54) FLEXIBLE TUBULAR MEMBER WITH SEALED TAPE LAYER

(75) Inventors: Dana J. Fraser, Panama City, FL (US); Charles Basil Firth, Newcastle upon Tyne (GB)

(73) Assignee: Wellstream International Limited, Newcastle upon Tyne (GB)

(*) Notice: Subject to any disclaimer, the term of this patent is extended or adjusted under 35 U.S.C. 154(b) by 13 days.

(21) Appl. No.: 10/305,896

(22) Filed: Nov. 27, 2002

(65) Prior Publication Data
US 2004/0099324 A1 May 27, 2004

(51) Int. Cl.[7] .............................. F16L 9/16; B65H 81/00
(52) U.S. Cl. .................... 138/129; 138/150; 138/154; 156/184; 156/188
(58) Field of Search ........................ 138/129, 130, 138/150, 154, DIG. 7, 144; 156/187, 184, 188, 190, 191, 192, 195, 86, 305

(56) References Cited

U.S. PATENT DOCUMENTS

| | | | | |
|---|---|---|---|---|
| 2,161,036 A | * | 6/1939 | Gremmel et al. | 156/187 |
| 2,713,383 A | * | 7/1955 | Kennedy | 156/86 |
| 2,937,665 A | * | 5/1960 | Kennedy | 138/145 |
| 2,941,911 A | * | 6/1960 | Miles et al. | 156/86 |
| 3,153,990 A | * | 10/1964 | Kunzog | 92/169.1 |
| 3,616,123 A | * | 10/1971 | Reynolds et al. | 428/222 |
| 3,823,045 A | * | 7/1974 | Hielema | 156/188 |
| 4,218,814 A | * | 8/1980 | Hodapp | 29/450 |
| 4,645,553 A | * | 2/1987 | Languillat | 156/153 |
| 4,788,089 A | * | 11/1988 | Skipper | 428/34.9 |
| 4,791,966 A | * | 12/1988 | Eilentropp | 138/154 |
| 5,800,886 A | * | 9/1998 | Vallauri et al. | 428/35.8 |
| 6,284,997 B1 | * | 9/2001 | Zehavi et al. | 219/121.46 |
| 6,363,974 B1 | | 4/2002 | Perez et al. | |

* cited by examiner

*Primary Examiner*—Patrick Brinson
(74) *Attorney, Agent, or Firm*—Klarquist Sparkman LLP

(57) ABSTRACT

A flexible pipe in which a layer of wound tape extends adjacent a surface of a tubular member to limit or prevent molecular migration through the tubular member.

27 Claims, 3 Drawing Sheets

FLEXIBLE TUBULAR MEMBER WITH SEALED TAPE LAYER

BACKGROUND

This disclosure relates generally to flexible pipes, and, more particularly, to a new design for a flexible pipe having a sealed tape layer.

Flexible pipes are in common use and are usually fabricated from layers of extruded plastic, tapes, and metals. These pipes often have interior layers that are often required to be essentially hermetic and are susceptible to corrosion or environmental damage from sunlight, oxygen, water, abrasion, and other environmental conditions.

DETAILED DESCRIPTION

Figure 1:
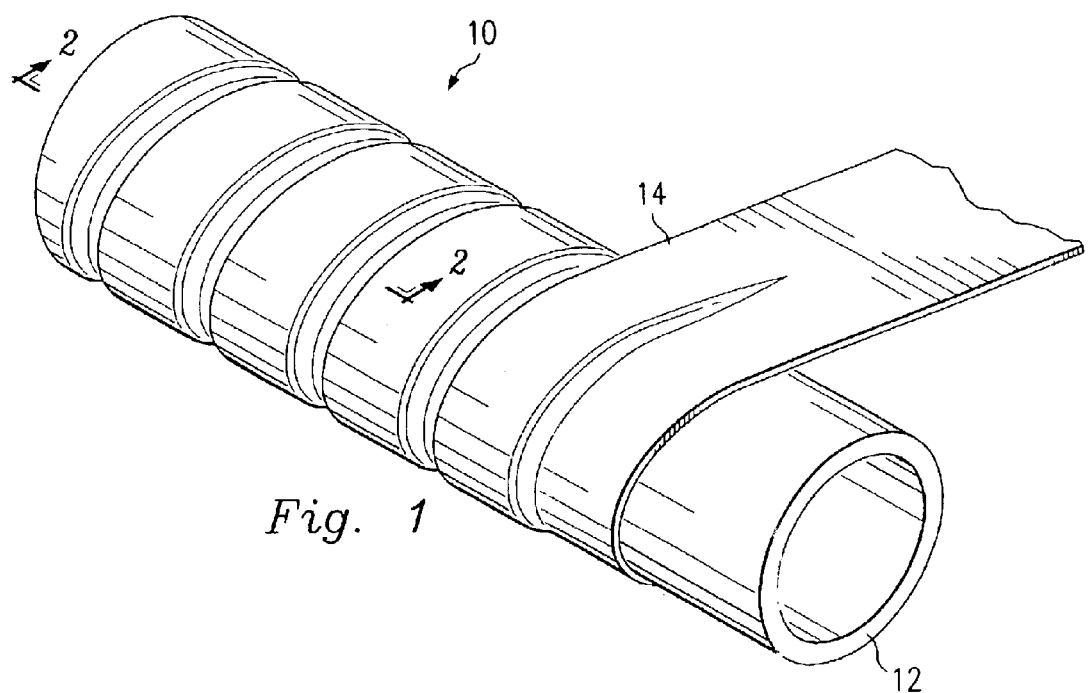
FIG. 1 is an isometric view of a flexible pipe according to an embodiment of the present invention.
Figure 2:
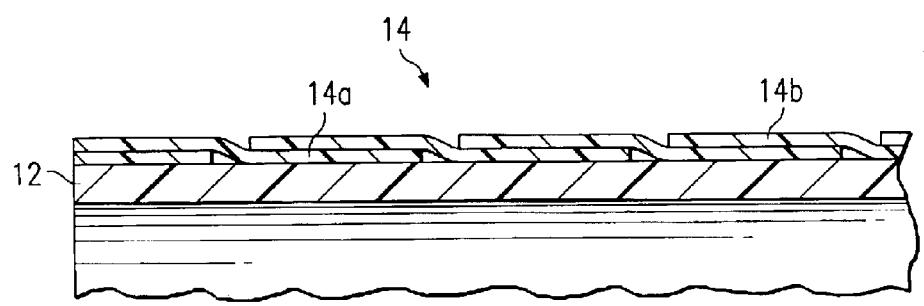
FIG. 2 is a cross-section of the pipe member of FIG. 1.

One embodiment of a flexible pipe is depicted in FIGS. 1 and 2 and is referred to, in general, by the reference numeral 10. The pipe 10 consists of an inner tubular member 12 which can consist of multiple layers formed, at least in part, by a multitude of reinforcing fibers or extruded polymer, graphite, or glass with relatively high tensile strength.

A tape 14 is helically wound over the outer surface of the tubular member 12 in a manner to form a plurality of axially-spaced wrapped sections with a portion of each section overlapping a portion of the previously wrapped, adjacent section. In particular, a portion 14a of each wrapped section is wrapped directly onto the underlying tubular member 12, while the remaining portion 14b of the latter section is wrapped over the corresponding portion 14a of the previously wrapped, adjacent section of the tape. This pattern of winding extends for the entire length of the tubular member 12 and thus covers the entire surface of the pipe. According to the example shown, the width of each portion 14a and 14b is approximately 50% of the width of the tape.

The portions 14a are thus wrapped at a relatively small effective diameter and the portions 14b are wrapped at a relatively large effective diameter. Since all the portions 14a and 14b initially have the same length, the portions 14b of the tape that overlap the portions 14a must stretch axially, and/or the portions 14a of the tape must shrink, to insure that the tape 14 is properly wrapped. Thus, the tape 14 can be formed, at least in part, by a polymer, such as a polyvinyl chloride or a polyolefin, that plastically deforms under tension to permit the axial stretching of the tape; and/or the tape can be formed, at least in part, by a polyolefin that shrinks when heated.

The polymer may have a coating of adhesive or other chemical material that bonds the overlapping tape portions 14b to the overlapped tape portions 14a. Any conventional adhesive or chemical material may be used as long as it adheres the tape portions 14a and 14b and provides a substantial hermetic seal sufficient to cause the wound tape 14 to approach the hermetic sealing ability of a solid extruded layer. Alternately, the polymer may be coated with a material that, when subjected to a chemical or heat activated process, cures, or activates, and, in effect, combines the overlapped portions 14a and the overlapping portions 14b into substantially a single layer to form a sealed tube. As another alternative, a fusion process can be used that uses the coating as a filler to fuse the portions 14a and 14b together.

Figure 3:
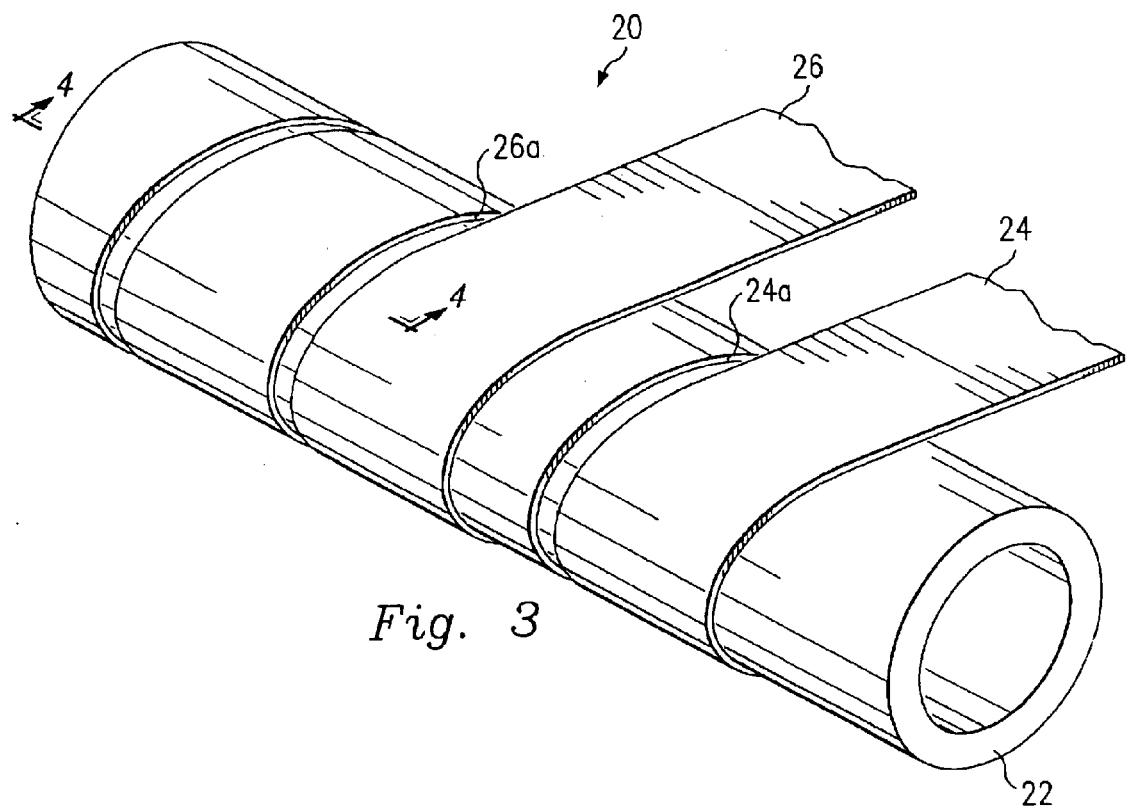
FIG. 3 is an isometric view of a flexible pipe according to another embodiment of the present invention.
Figure 4A:
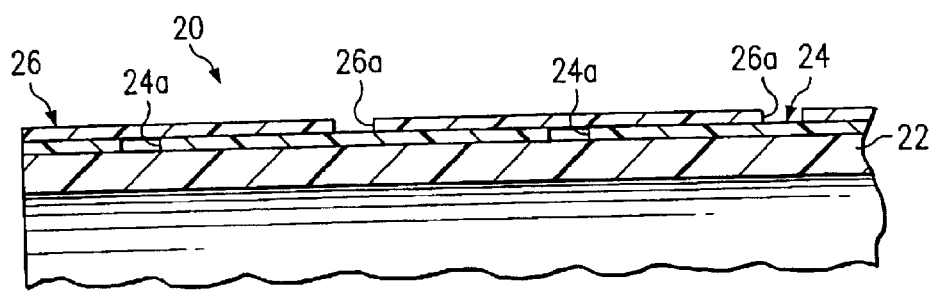
FIG. 4A is a cross-section of the flexible pipe of FIG. 3.

A flexible pipe according to another embodiment is referred to, in general, by the reference numeral 20 in FIGS. 3 and 4A, and includes an inner tubular member 22 which is identical to the member 12 of the previous embodiment.

A tape 24 is helically wound over the member 22 in a manner to cover substantially the entire surface of the tubular member 22, except for a small gap 24a between adjacent windings of the tape. A tape 26 is helically wound over the tape 24 in a manner to cover essentially the entire layer formed by the tape 24, except for a small gap 26a between adjacent windings of the tape 26. The winding of the tape 26 over the tape 24 is such that the gaps 26a are offset, or staggered, relative to the gaps 24a so that the tape 26 overlaps the gaps 24a, and the gaps 26a extend over the tape 24.

Each of the tapes 24 and 26 may be of the same material as the tape 14 in the previous embodiment and are wrapped in a flat helix using only single plane bends. Thus, the tape 24 lays flat against the tubular member 22, and the tape 26 lays against the tape 24 with minimal axial strain. The windings of the tapes 24 and 26 are such that they each extend from end to end of the tubular member 22 and cover substantially the entire surface of the pipe.

The tapes 24 and/or 26 may have a coating of adhesive or other chemical material that adheres the layer formed by the tape 24 to the tubular member 22 and/or the layer formed by the tape 26 to the tape 24. Any conventional adhesive or chemical material may be used and a hermetic seal is formed sufficient to approach the hermetic sealing ability of a solid extruded layer.

Alternately, the tapes 24 and/or 26 may be coated with a material that, when subjected to a chemical or heat activated process, cures, or fuses, and, in effect, combines the layers formed by the tapes into substantially a single layer to form a sealed tube.

Figure 4B:
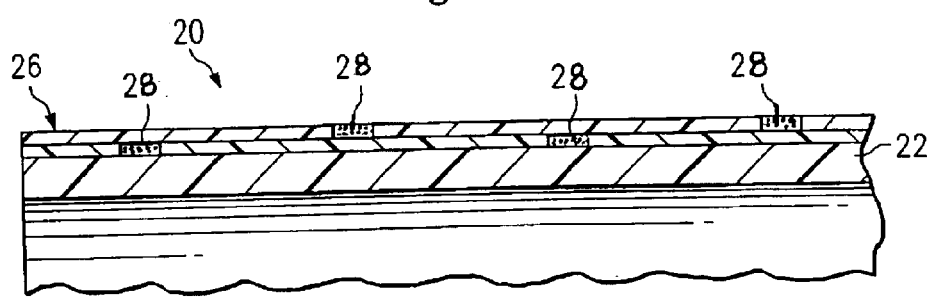
FIG. 4B is a view similar to that of FIG. 4A but depicting an alternate embodiment.

Also, as shown in FIG. 4B, a weldment, or bonding material, 28 may be provided in the gaps 24a and 26a so that each tape, in effect, forms a sealed tube.

Figure 5:
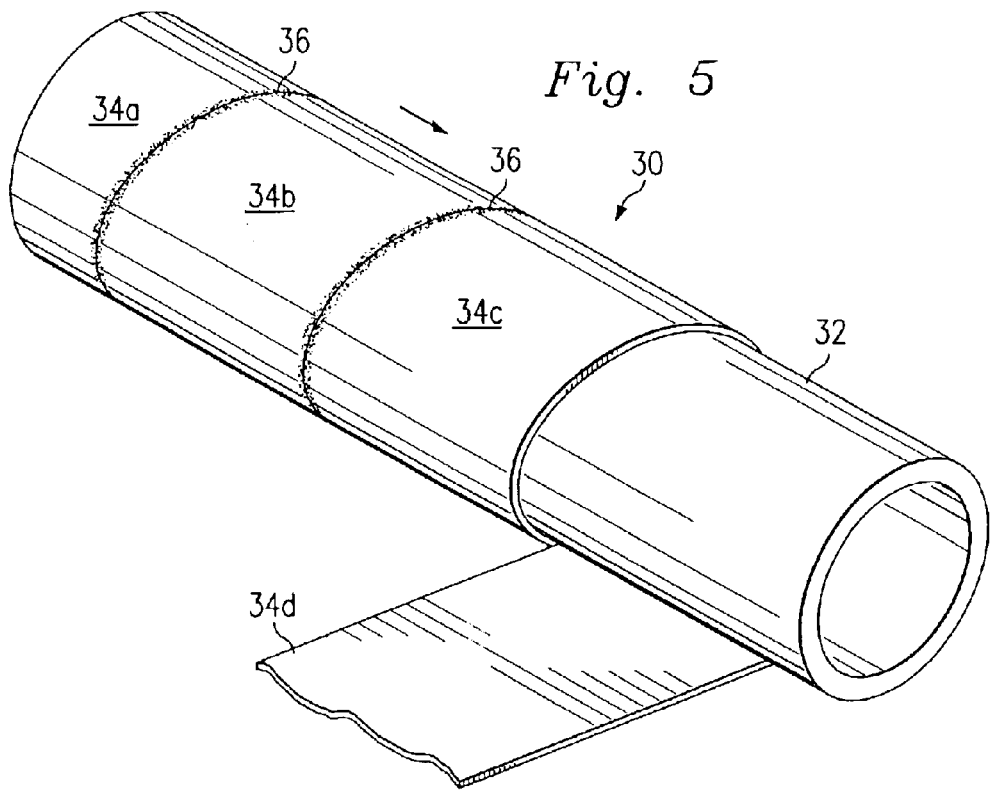
FIG. 5 is an isometric view of a flexible pipe according to another embodiment of the present invention.
Figure 6:
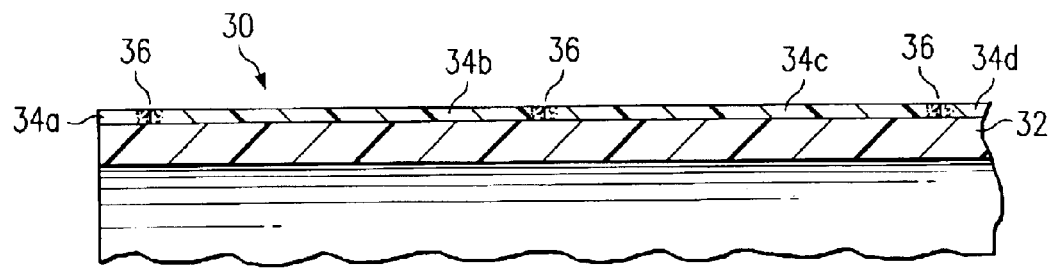
FIG. 6 is a cross-section of the flexible pipe of FIG. 5.

A flexible pipe according to another embodiment is referred to, in general, by the reference numeral 30 in FIGS. 5 and 6. The pipe 30 includes an inner tubular member 32 that is identical to the member 12 of the embodiment of FIGS. 1 and 2, and a tape 34 wound over the tubular member to form a plurality of adjacent sections, four of which are shown by the reference numerals 34a, 34b, 34c, and 34d. The winding of the tape is such that there is no overlap between the adjacent sections 34a, 34b, 34c, and 34d and so that the tape 34 covers substantially the entire surface of the tubular member 32 for its entire length. The winding is such that the respective edges of the sections 34a, 34b, 34b, and 34d are in a closely spaced relationship and a homogeneous strip 36 is bonded to the corresponding adjacent edges of the adjacent sections of the tape. Preferably, the strips 36 are bonded to the sections 34a, 34b, 34c, and 34d by melting a filler rod onto their corresponding adjacent edges. It is understood that other conventional types of bonding or welding can be utilized.

The tapes 34 may have a coating of adhesive or other chemical material that adheres it to the tubular member 22. Any conventional adhesive or chemical material may be used as long as a hermetic seal is formed sufficient to approach the hermetic sealing ability of a solid extruded layer.

It is understood that the materials forming the tapes 14, 24/26 and 34 of the above embodiments can include UV opaque or resistant material, such as PE filled with chemical stabilizers including anti-oxidants, light stabilizers or other materials to prevent degradation due to exposure to heat and ultraviolet light. Also, the tapes 14, 24/26, and 34 may include a material with high reflectivity, such as PE filled with $TiO_2$.

The tapes 14, 24/26, and 34 provide a seal to protect the underlying tubular member 12, 22, and 32, respectively, from damaging external influences, such as sunlight to seawater or water and oxygen. Also, in subsea applications, the tapes 14, 24/26, and 34 limit molecular migration of permeates, such as molecules of water, $CH_4$, $CO_2$, or $H_2S$ from the inner tubular members 12, 22, and 32, respectively.

It is understood that variations may be made in the foregoing without departing from the scope of the invention. For example, it is understood that the term "flexible pipe" means any type of vessel or container, such as conduits, hoses, tubes, wires, fiber optic cables, lines, tubes, etc. which convey fluid or serve as a conduit for other elements. Also, the tapes 14, 24/26, and 34 can be used to form inner layers in the manner described above that are disposed on the inner walls of the inner tubular members 12, 22, and 32, respectively. Further, it is understood that the width of the sections 14a and 14b of the embodiment of FIGS. 1 and 2 can vary from that disclosed in the example. Moreover, the tapes 24/26 and 34 of the embodiments of FIGS. 3 and 4A and 4B, respectively, do not have to be identical to the tape 14 of the embodiment of FIGS. 1 and 2, but rather can be formed of materials that do not plastically deform under tension and/or shrink with the application of heat. Still further, it is understood that the embodiments described above are not limited to the specific number of layers disclosed above, but rather additional layers can be provided that extend under or over the layers disclosed above. As an example of the latter, a protective outer sheath can be provided over the tapes 14, 26, and 34. Moreover, the tapes 14, 24/26 and 34 do not have to be wound helically as disclosed, but rather they can be wound circumferentially around their corresponding tubular members 12, 14, and 16, respectively, to form one or more rings or cylinders extending parallel to the tubular member. Still further, the tapes 14, 24/26, and 34 can be run axially between the ends of the tubular members 12, 22, and 32, respectively. While the tapes 14, 24/26, and 34 are shown as having a rectangular cross-section, versions with shaped cross-sections, including an interlocking feature, such as a tongue-in-groove, or sections with thin and thick areas that essentially interlock, are anticipated.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A flexible pipe comprising a tubular member, and a non-preformed layer of tape wrapped over a surface of the tubular member in a manner to form a plurality of axially-spaced tape sections with a portion of each section wrapped directly onto the surface of the tubular member and another portion of each section overlapping a portion of the previously wrapped adjacent section, the portions that are wrapped onto the tubular member having a relatively small effective diameter and the portions that are wrapped onto the previously wrapped adjacent portion having a relatively large effective diameter, the tape being formed, at least in part, by a material that shrinks when it is heated to permit shrinkage of the portions that are wrapped onto the tubular member.

2. The pipe of claim 1, wherein the material is a polyolefin.

3. The pipe of claim 1, wherein the tape is coated by a material that causes each portion to adhere to its corresponding overlapped portion.

4. The pipe of claim 1, wherein the tape is coated by a material that cures or fuses when subject to heat to combine the overlapping and overlapped portions.

5. The pipe of claim 1, wherein the tape portions that are wrapped on the tubular member are wrapped on the outer surface of the tubular member.

6. A flexible pipe comprising:
   a tubular member;
   a first layer of tape wrapped over a surface of the tubular member in a manner to form a plurality of axially-spaced tape sections having a gap between adjacent sections;
   a second layer of tape wrapped over the first layer of tape in a manner to form a plurality of axially-spaced tape sections having a gap between adjacent sections,
   the sections of the second layer of tape overlapping the gaps formed between adjacent sections of the first layer of tape, and
   the gaps formed between adjacent sections of the second layer of tape extending over the sections of the first layer of tape; and
   a weldment or bonding material provided in the gaps so that each tape forms a sealed tube.

7. The pipe of claim 6 wherein at least one of the layers of tape is coated by a material that causes the first and second layers to adhere.

8. The pipe of claim 6 wherein at least one of the layers of tape is coated by a material that cures or fuses when subject to heat to combine the first and second layers.

9. The pipe of claim 6 wherein the first layer is wrapped on the outer surface of the tubular member.

10. A flexible pipe comprising a tubular member; a layer of tape having a uniform thickness wrapped over a surface of the tubular member in a manner to form a plurality of axially-spaced wrapped sections, the wrapping of the tape being such that the respective edges of the sections are in a closely spaced relationship; and a strip bonded to the corresponding adjacent edges of the adjacent sections.

11. The pipe of claim 10 wherein the strips are bonded to the corresponding adjacent edges by melting a filler rod onto the edges.

12. The pipe of claim 10 wherein the tape is coated with a material that causes it to adhere to the tubular member.

13. The pipe of claim 10 wherein the layer of tape is wrapped on the outer surface of the tubular member.

14. A method of manufacturing a flexible pipe comprising wrapping a non-preformed layer of tape over a surface of a tubular member in a manner to form a plurality of axially-spaced tape sections with a portion of each section wrapped directly onto the tubular member and another portion of each section overlapping a portion of the previously wrapped adjacent section, the portions that are wrapped onto the surface of the tubular member having a relatively small effective diameter and the portions that are wrapped onto the previously wrapped adjacent portion having a relatively large effective diameter, the tape being formed, at least in part, by a material that shrinks when it is heated to permit shrinkage of the portions that are wrapped onto the tubular member.

15. The method of claim 14 wherein the material is a polyolefin.

16. The method of claim 14 further comprising coating the tape with a material that causes each portion to adhere to its corresponding overlapped portion.

17. The method of claim 14 further comprising coating the tape with a material, and subjecting the material to heat to cure or fuse to combine the overlapping and overlapped portions of the tape.

18. The method of claim 14 wherein the tape portions that are wrapped on the tubular member are wrapped on the outer surface of the tubular member.

19. A method of manufacturing a flexible pipe comprising:
    wrapping a first layer of tape over a surface of a tubular member in a manner to form a plurality of axially-spaced tape sections having a gap between adjacent sections;
    wrapping a second layer of tape over the first layer of tape in a manner to form a plurality of axially-spaced tape sections having a gap between adjacent sections, the sections of the second layer of tape overlapping the gaps formed between adjacent sections of the first layer of tape, and
    the-gaps formed between adjacent sections of the second layer of tape extending over the sections of the first layer of tape; and
    providing a weldment or bonding material in the gaps so that each tape forms a sealed tube.

20. The method of claim 19 further comprising welding or bonding the sections at the gaps so that each tape forms a sealed tube.

21. The method of claim 19 further comprising coating at least one of the layers of tape with a material that causes the first and second layers to adhere.

22. The method of claim 19 further comprising coating at least one of the layers of tape with a material, and subjecting the material to heat to cure or fuse the material to combine the first and second layers.

23. The method of claim 19 wherein the first layer is wrapped on the outer surface of the tubular member.

24. A method of manufacturing a flexible pipe comprising wrapping a layer of tape having a uniform thickness wrapped over a surface of a tubular member in a manner to form a plurality of axially-spaced wrapped sections, while closely spacing die respective edges of the sections; and bonding a strip to the corresponding adjacent edges of the adjacent sections.

25. The pipe of claim 24 wherein the step of bonding comprises melting a filler rod onto the edges.

26. The pipe of claim 24 further comprising coating the tape with a material that causes it to adhere to the tubular member.

27. The pipe of claim 24 wherein the layer of tape is wrapped on the outer surface of the tubular member.

* * * * *